(12) United States Patent
Du et al.

(10) Patent No.: US 10,949,701 B2
(45) Date of Patent: Mar. 16, 2021

(54) METHOD, APPARATUS AND STORAGE MEDIUM FOR RECOGNIZING CHARACTER

(71) Applicant: IFLYTEK CO., LTD., Anhui (CN)

(72) Inventors: Jun Du, Anhui (CN); Jianshu Zhang, Anhui (CN); Lirong Dai, Anhui (CN); Jinshui Hu, Anhui (CN); Jiajia Wu, Anhui (CN); Cong Liu, Anhui (CN); Guoping Hu, Anhui (CN); Qingfeng Liu, Anhui (CN)

(73) Assignee: IFLYTEK CO., LTD., Anhui (CN)

( * ) Notice: Subject to any disclaimer, the term of this patent is extended or adjusted under 35 U.S.C. 154(b) by 223 days.

(21) Appl. No.: 16/179,719

(22) Filed: Nov. 2, 2018

(65) Prior Publication Data

US 2020/0143191 A1    May 7, 2020

(51) Int. Cl.
*G06K 9/62* (2006.01)
*G06K 9/46* (2006.01)

(52) U.S. Cl.
CPC ......... *G06K 9/4604* (2013.01); *G06K 9/6262* (2013.01); *G06K 2209/01* (2013.01)

(58) Field of Classification Search
CPC ........... G06K 2209/01; G06K 9/00671; G06K 9/6256; G06K 9/00362; G06K 7/1482; G06K 9/4604; G06K 9/6262; G06K 2209/011; G06K 9/6272; G06K 9/00416; G06T 7/70; G06T 3/4046; G06T 9/002; G06T 2207/20084
USPC ......... 382/156, 181, 185, 187, 210; 434/157
See application file for complete search history.

(56) References Cited

U.S. PATENT DOCUMENTS

| | | | | |
|---|---|---|---|---|
| 7,903,877 | B2 * | 3/2011 | Han ................... | G06K 9/00879 382/181 |
| 10,572,727 | B1 * | 2/2020 | Sachtleben .......... | G06Q 20/102 |

OTHER PUBLICATIONS

Jianshu Zhang, A GRU-based Encoder-Decoder Approach with Attention for Online Handwritten Mathematical Expression Recognition-,National Engineering Laboratory for Speech and Language Information Processing University of Science and Technology of China, Hefei,Anhui, P. R. China,Email: xysszjs@mail.ustc.edu.cn, iundu@ustc.edu.cn, lrdai@ustc.edu.cn.2017 14th IAPR International Conference on Document Analysis and Recognition, pp. 902-907.

Long-Long Ma, A New Radical-Based Approach to Online Handwritten Chinese Character Recognition.National Laboratory of Pattern Recognition,Institute of Automation, Chinese Academy of Sciences 95 Zhongguancun East Road, Beijing 100190, P. R. China {longma, liucl}@nlpria.ac.cn.978-1-4244-2175-6/08/$25.00 © 2008 IEEE.

Matthew D. Zeiler, Adadelta: An Adaptive Learning Rate Method,Google Inc.,USA,New York University, USA,arXiv:1212.5701v1 [cs.LG] Dec. 22, 2012.

(Continued)

*Primary Examiner* — Charlotte M Baker
(74) *Attorney, Agent, or Firm* — Yue (Robert) Xu; Apex Attorneys at Law, LLP

(57) ABSTRACT

A method for recognizing a character includes: obtaining a character; converting the character into a radical based character recognition result, where the radical based character recognition result comprises symbols indicating radicals of the character and a structure of the radicals of the character; and recognizing the character based on the radical based character recognition result.

18 Claims, 7 Drawing Sheets

(56) References Cited

OTHER PUBLICATIONS

Minh-Thang Luong,Addressing the Rare Word Problem in Neural Machine Translation.Stanford,lmthang@stanford.edu Ilya Sutskever,Quoc V. Le,Oriol Vinyals,Wojciech Zaremba,{ilyasu,qvl,vinyals}@google.com,New York University woj.zaremba@gmail.com,May 30, 2015.

Shi Kuo Chang, An Interactive System for Chinese Character Generation and Retrieval,IEEE Transactions on Systems, Man, and Cybernetics, May 1973,pp. 257-265.

Ching Y. Suen, Automatic Recognition of Handprinted Characters—The State of the Art,Proceedings of the IEEE, vol. 68, No. 4, Apr. 1980, pp. 469-487.

Cheng-Lin Liu, CASIA Online and Offline Chinese Handwriting Databases,National Laboratory of Pattern Recognition (NLPR) Institute of Automation of Chinese Academy of Sciences 95 Zhongguancun East Road, Beijing 100190, P.R. China, Email: {liucl, fyin, dhwang, wangqf}@nlpr.ia.ac.cn,2011 International Conference on Document Analysis and Recognition, 1520-5363/11 $26.00 © 2011 IEEE DOI 10.1109/ICDAR.2011.17, pp. 37-41.

Maurizio Corbetta and Gordon L. Shulman,Control of Goal-Directed and Stimulus-Driven Attention in the Brain,Nature Reviews | Neuroscience,vol. 3 | Mar. 2002,pp. 201-215.

Andrej Karpathy,Deep Visual-Semantic Alignments for Generating Image Descriptions,Department of Computer Science, Stanford University,This CVPR2015 paper is the Open Access version, provided by the Computer Vision Foundation. The authoritative version of this paper is available in IEEE Xplore, pp. 3128-3137.

Xu-Yao Zhang,Drawing and Recognizing Chinese Characters with Recurrent Neural Network,IEEE Transactions on Pattern Analysis and Machine Intelligence, vol. 40, No. 4, Apr. 2018,0162-8828 2017 IEEE. http://www.ieee.org/publications_standards/publications/rights/index.html for more information. pp. 849-862.

WeixinYang,DropSample: Anewtrainingmethodtoenhancedeepconvolutional neuralnetworksforlarge scaleunconstrainedhandwrittenChinese characterrecognition,journalhomepage: www.elsevier.com/locate/pr. PatternRecognition58(2016)190-203.

Minh-Thang Luong, Effective Approaches to Attention-based Neural Machine Translation,Computer Science Department, Stanford University, Stanford, CA 94305,arXiv:1508.04025v5 [cs.CL] Sep. 20, 2015.

Junyoung Chung, Empirical Evaluation of Gated Recurrent Neural Networks on Sequence Modeling, arXiv:1412.3555v1 [cs.NE] Dec. 11, 2014, pp. 1-9.

Dzmitry Bandanau, End-To-End Attention-Based Large Vocabulary Speech Recognition. 978-1-4799-9988-0/16/$31.00 © 2016 IEEE, ICASSP 2016,pp. 4945-4549.

Zhuoyao Zhong, High Performance Offline Handwritten Chinese Character Recognition Using GoogLeNet and Directional Feature Maps, School of Electronic and Information Engineering, South China University of Technology Guangzhou, China, 2015 13th International Conference on Document Analysis and Recognition (ICDAR), 978-1-4799-1805-8/15/$31.00 © 2015 IEEE, pp. 846-850.

Fei Yin ei al.,ICDAR 2013 Chinese Handwriting Recognition Competition,National Laboratory of Pattern Recognition (NLPR)Institute of Automation of Chinese Academy of Sciences, Beijing 100190, China,2013 12th International Conference on Document Analysis and Recognition.

Alex Krizhevsky, Ilya Sutskever, and Geoffrey E Hinton, "Imagenet classification with deep convolutional neural networks," in Advances in neural information processing systems, 2012, pp. 1097-1105.

Yoshua Bengio, Patrice Simard, and Paolo Frasconi, "Learning long-term dependencies with gradient descent is difficult," IEEE transactions on neural networks, vol. 5, No. 2, pp. 157-166, Mar. 1994.

Kyunghyun Cho, "Learning Phrase Representations using RNN Encoder-Decoder for Statistical Machine Translation," arXiv:1406.1078v3 [cs.CL] Sep. 3, 2014.

W. Chan, "Listen, attend and spell," arXiv:1508.01211v2 [cs.CL] Aug. 20, 2015.

Zhaopeng Tu, "Modeling coverage for neural machine translation," arXiv:1601.04811v6 [cs.Cl] Aug. 6, 2016.

Zhuoyao Zhong, Lianwen Jin, and Ziyong Feng, "Multi-font printed Chinese character recognition using multi-pooling convolutional neural network," in Document Analysis and Recognition (ICDAR), 2015 13th International Conference on. IEEE, 2015, pp. 96-100.

Jianshu Zhang,"Multi-Scale Attention with Dense Encoder for Handwritten Mathematical Expression Recognition", arXiv:1801.03530v2 [cs.CV] Jan. 31, 2018,pp. 1-6.

Kyunghyun Cho,"Natural Language Understanding with Distributed Representation", arXiv:1511.07916v1 [cs.CL] Nov. 24, 2015,pp. 1-124.

Dzmitry Bandanau,"Neural Machine Translation by Jointly Learning to Align and Translate", Published as a conference paper at ICLR 2015,arXiv:1409.0473v7 [cs.CL] May 19, 2016,pp. 1-15.

Rejean Plamondon,"On-Line and Off-Line Handwriting Recognition:A Comprehensive Survey",1EEE Transactions on Pattern Analysis and Machine Intelligence vol. 22, No. 1. Jan. 2000, pp. 63-84.

Cheng-Lin Liu,"Online and offline handwritten Chinese character recognition:Benchmarking on new databases",Pattern Recognition, vol. 46, No. 1, pp. 155-162, 2013.

Cheng-Lin Liu,"Online Recognition of Chinese Characters:The State-of-the-Art ",IEEE Transactions on Pattern Analysis and Machine Intelligence, vol. 26, No. 2, Feb. 2004,pp. 198-213.

An-Bang Wang,"Optical recognition of handwritten Chinese characters by hierarchical radical matching method", Pattern Recognition 34 (2001) pp. 15-35.

Jianshu Zhang,"RAN: Radical analysis networks for zero-shot learning of Chinese characters",arXiv:1711.01889v1 [cs.CV] Nov. 3, 2017,pp. 1-6.

Jianshu Zhang,"Radical Analysis Network for Zero-Shot Learning in Printed Chinese Character Recognition",imarXiv:1711.01889v2 [cs.CV] Mar. 29, 2018,pp. 1-6.

Tie-Qiang Wang,"Radical-Based Chinese Character Recognition via Multi-Labeled Learning of Deep Residual Networks",2017 14th IAPR International Conference on Document Analysis and Recognition,2379-2140/17 $31.00 © 2017 IEEE DOI 10.1109/ICDAR.2017.100,pp. 579-584.

Jianshu Zhang,"RNN-BLSTM Based Multi-Pitch Estimation",INTERSPEECH 2016 Sep. 8-12, 2016, San Francisco, USA,pp. 1785-1789.

Oriol Vinyals,"Show and Tell: A Neural Image Caption Generator", in Proceedings of the IEEE conference on compute vision and pattern recognition, 2015, pp. 3156-3164.

Kelvin Xu, "Show, attend and tell: Neural image caption generation with visual attention", in International Conference on Machine Learning, 2015, pp. 2048-2057.

A. Graves, "Speech recognition with deep recurrent neural networks," in Acoustics, speech and signal processing (icassp), 2013 ieee international conference on. IEEE, 2013, pp. 6645-6649.

Alex Graves, "Supervised sequence labelling with recurrent neural networks", Springer, 2012, vol. 385.

Li Xiaotong,"The Writing Order of Modem Chinese Character Components", The journal of moderniza¬tion of Chinese language education, 2013,pp. 26-41.

Jianshu Zhang,"Trajectory-based Radical Analysis Network for Online Handwritten Chinese Character Recognition", the 24th International Conference on Pattern Recognition (ICPR) Beijing, China, Aug. 20-24, 2018, pp. 3681-3686.

Karen Simonyan, "Very Deep Convolutional Networks for Large-Scale Image Recognition", arXiv:1409.1556v6 [cs.CV] Apr. 10, 2015,Published as a conference paper at ICLR 2015.

Lianli Gao,"Video Captioning With Attention-Based LSTM and Semantic Consistency" IEEE Transactions on Multimedia, vol. 19, No. 9, Sep. 2017, pp. 2045-2055.

(56) References Cited

OTHER PUBLICATIONS

Jianshu Zhang, "Watch, attend and parse: An end-to-end neural network based approach to handwritten mathematical expression recognition", Pattern Recognition, vol. 71, pp. 196-206, 2017.

* cited by examiner

撮撮撮撮撮撮撮撮
a  {  扌  a  {  d  {  十

撮撮撮撮撮撮撮撮
具  }  d  {  厂  d  {  目

撮撮撮撮撮撮
八  }  }  }  }  <eos>

METHOD, APPARATUS AND STORAGE MEDIUM FOR RECOGNIZING CHARACTER

FIELD

The disclosure relates to the field of image recognition, and particularly to a method, apparatus and storage medium for recognizing a character.

BACKGROUND

Character recognition is important in various fields such as machine translation and so on. Conventionally, character recognition is usually performed on whole characters. In this way, it is hard to recognize all characters due to huge numbers of character classes. In addition, in view of increasing novel characters, the conventional recognition method is hard to recognize novel characters.

SUMMARY

A method for recognizing a character is provided according to an embodiment of the disclosure. The method includes: obtaining a character; converting the character into a radical based character recognition result, wherein the radical based character recognition result comprises symbols indicating radicals of the character and a structure of the radicals of the character; and recognizing the character based on the radical based character recognition result.

An apparatus for recognizing a character is further provided according to an embodiment of the disclosure. The apparatus includes a processor and a non-transitory storage medium having a plurality of instructions stored thereon that, when executed by the processor, cause the processor to: obtain a character; convert the character into a radical based character recognition result, wherein the radical based character recognition result comprises symbols indicating radicals of the character and a structure of the radicals of the character; and recognize the character based on the radical based character recognition result.

A storage medium storing a computer program is further provided according to an embodiment of the disclosure. The computer program comprises a plurality of computer-readable instructions that, when executed by a computer, cause the computer to: obtain a character; convert the character into a radical based character recognition result, wherein the radical based character recognition result comprises symbols indicating radicals of the character and a structure of the radicals of the character; and recognize the character based on the radical based character recognition result.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION

In order to make those skilled in the art understand the technical solutions of the present disclosure better, the technical solutions in the embodiments of the present disclosure are described in detail below in conjunction with the drawings in the embodiments of the present disclosure. Obviously, the described embodiments are only some of the embodiments of the present disclosure, but not all the embodiments. All the 25000 embodiments obtained by those skilled in the art based on the embodiments of the present disclosure without creative work will fall within the scope of protection of the present disclosure.

In language systems such as Chinese language, Japanese language and Korean language, there are huge numbers of characters. Taking Chinese language as an example, character categories are more than 25,000 and the number is still increasing as more and more novel characters continue being created. Most conventional methods cannot recognize all characters and cannot recognize novel characters.

However, the enormous characters each is composed of basic structural components, called radicals, arranged with a structure. Taking Chinese language as an example, there are about 500 fundamental and structural radicals and the 500 radicals are adequate to describe more than 25,000 Chinese characters with only about 10 structures.

Therefore, a method for recognizing a character by identifying radicals and two-dimensional spatial structures among the radicals is proposed in the present application. In an embodiment, the character is recognized by using a character recognition model. The character recognition model may be neural networks that simulate person to remember and recognize, for example, Chinese characters, by identifying radicals, understanding the meaning of radicals and grasping the possible spatial structures between them. Such learning way is more generative and helps improving the memory ability to learn so many characters. In this way, the huge number of characters can be recognized by limited quantities of radicals and spatial structures, and novel characters can also be recognized by the trained neural networks as long as the novel characters are composed by known radicals and spatial structures.

Figure 1:
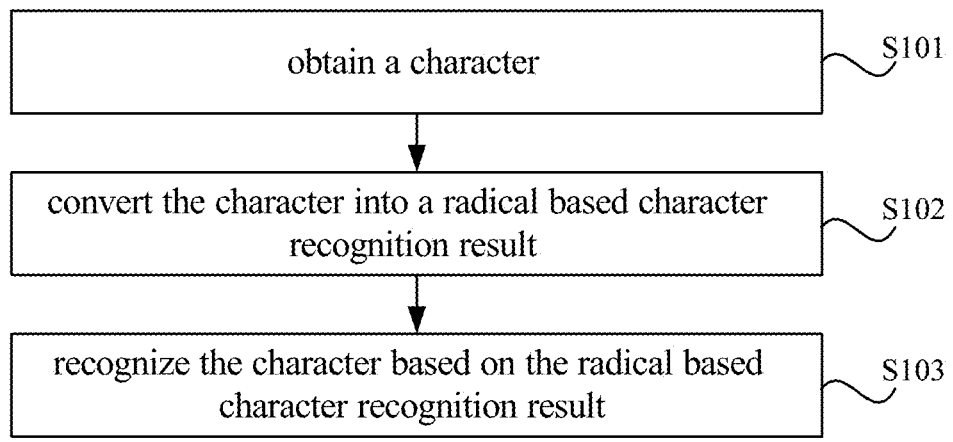
FIG. 1 is a flowchart of a method for recognizing a character according to an embodiment of the present disclosure.

FIG. 1 illustrates a method for recognizing a character according to an embodiment of the disclosure. The method includes:

S101, obtaining a character;

S102, converting the character into a radical based character recognition result, where the radical based character recognition result comprises symbols indicating radicals of the character and a structure of the radicals of the character; and S103, recognizing the character based on the radical based character recognition result.

In an implementation, converting the character into the radical based character recognition result comprises: inputting the character into a character recognition model to obtain the radical based character recognition result, where the character recognition model is obtained by training on a set of samples.

In an implementation, inputting the character into the character recognition model comprises inputting data of an image including the character into the character recognition model. For example, a printed character is to be recognized and the image including the printed character is inputted into the character recognition model.

The image may be an image including printed characters or handwritten characters, and the character may be composed of one or more radicals arranged in a specific spatial structure.

In an implementation, the image is a greyscale image and the pixel value of the image is normalized between 0 and 1. Therefore, the method may further comprise converting the image into a greyscale image and normalizing the pixel value of the image between 0 and 1. The normalized image is then inputted into the character recognition model.

In an implementation, before being inputted into the character recognition model, the image is further processed by clearing image information of image except for the region of the character. For example, values of pixels of the region of the image except for the region of the character are set to be (0,0,0). In this way, background noises of the image are removed without loss of character information, thereby preventing the character recognition model from being affected by background noises.

In an implementation, S101 may include: obtaining the image including a character by reading the image from a storage.

In an implementation, inputting the character into the character recognition model comprises obtaining data of the character with stroke information and inputting the data of the character with the stroke information into the character recognition model. The stroke information may comprise pen-down and pen-up information of each point of the character. For example, a handwritten character is to be recognized and data of the handwritten character with stroke information of the handwritten character is inputted into the character recognition model.

In an embodiment, the character recognition model is neural networks that are trained as a whole. A character is inputted into the character recognition model. The character recognition model extracts and analyzes features of the character and outputs a radical based character recognition result including symbols indicating radicals of the character and a structure of the radicals of the character.

Figure 2:
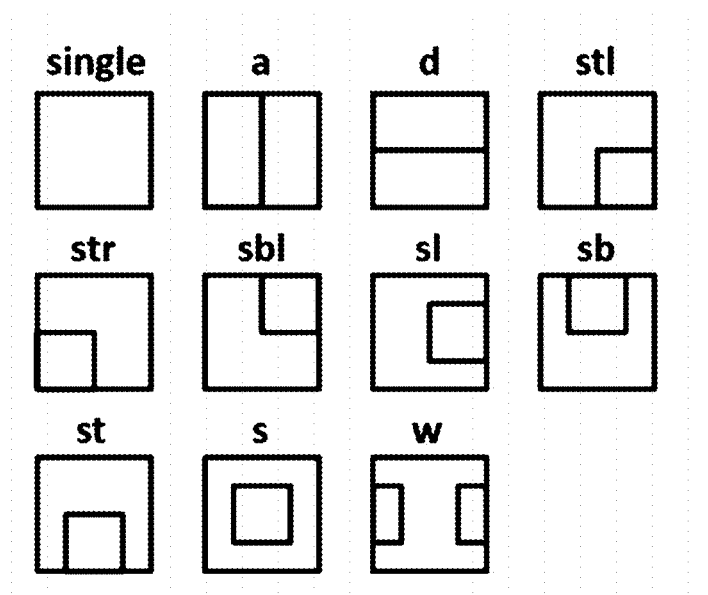
FIG. 2 illustrates examples of spatial structures of characters.
Figure 3:
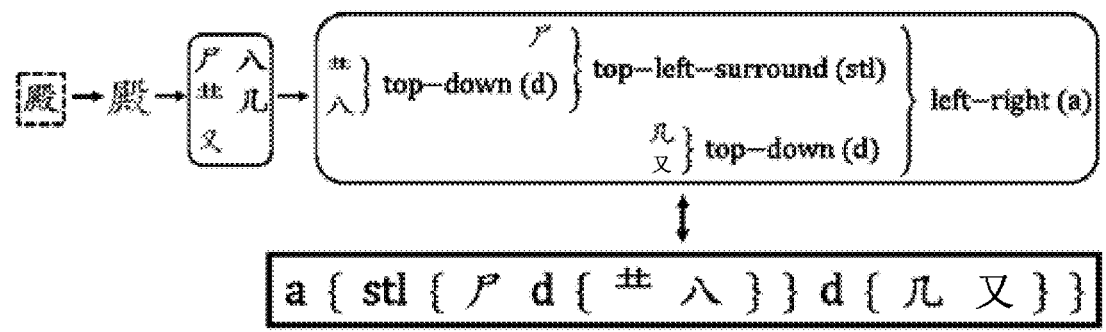
FIG. 3 illustrates an example of decomposing and representation of a character.

FIGS. 2 and 3 illustrate character analysis by the character recognition model. FIG. 2 illustrates examples of spatial structures of characters. FIG. 3 illustrate an example of decomposing and representation of a character. As shown in FIG. 2, the spatial structures of characters include a single structure, a left-right (represented as a) structure, a top-bottom (represented as d) structure, a top-left-surround (represented as stl) structure, a top-right-surround (represented as str) structure, a bottom-left-surround (represented as sb1) structure, a left-surround (represented as sl) structure, a bottom-surround (represented as sb) structure, a top-surround (represented as st) structure, a surround (represented as s) structure, and a within (represented as w) structure. In an implementation, the character is represented in a form of a structure identity {radical . . . radical}. A pair of braces is adopted to constrain a single structure in the radical based character recognition result. As shown in FIG. 3, the character "殿" is decomposed as radicals "厂", "共", "八", "几" and "又" with a top-down (d) structure of "共" and "八", a top-left-surround (stl) structure of "厂" and "共", a top-down (d) structure of "几" and "又", and a left-right (a) structure of "展" and "殳". Therefore, the character is presented as a {stl{厂d{共 八}}d{几 又}}. Specifically, for a single structure, i.e., a character which is represented by a single radical, we can present the single structure as e and represent a character comprising only a single radical as e {radical}. Alternatively, we also can represent the single structure as no structure in the character.

Figure 4:
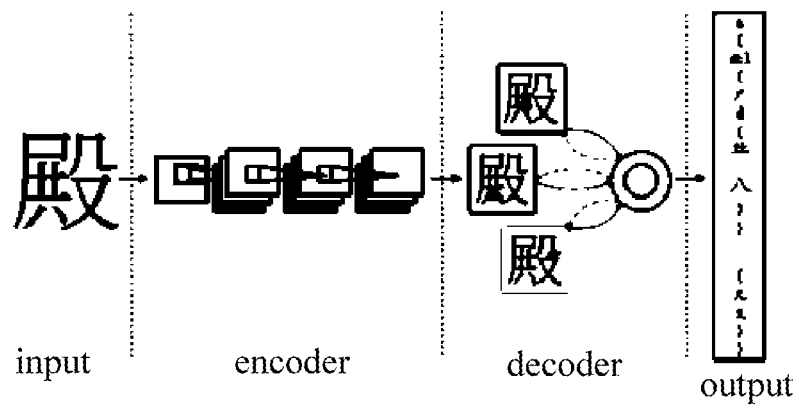
FIG. 4 illustrates a structure of a character recognition model according to an embodiment of the present disclosure.

FIG. 4 illustrates a structure of a character recognition model according to an embodiment of the present disclosure. As shown in FIG. 4, the character recognition model includes an encoder and a decoder. The encoder firstly receives an input of an image containing a character and encodes the image into annotation vectors. The decoder then processes the annotation vectors to obtain and output a radical based character recognition result including symbols indicating radicals of the character and a structure of the radicals of the character. The encoder and decoder of the character recognition model are trained jointly.

Figure 5:
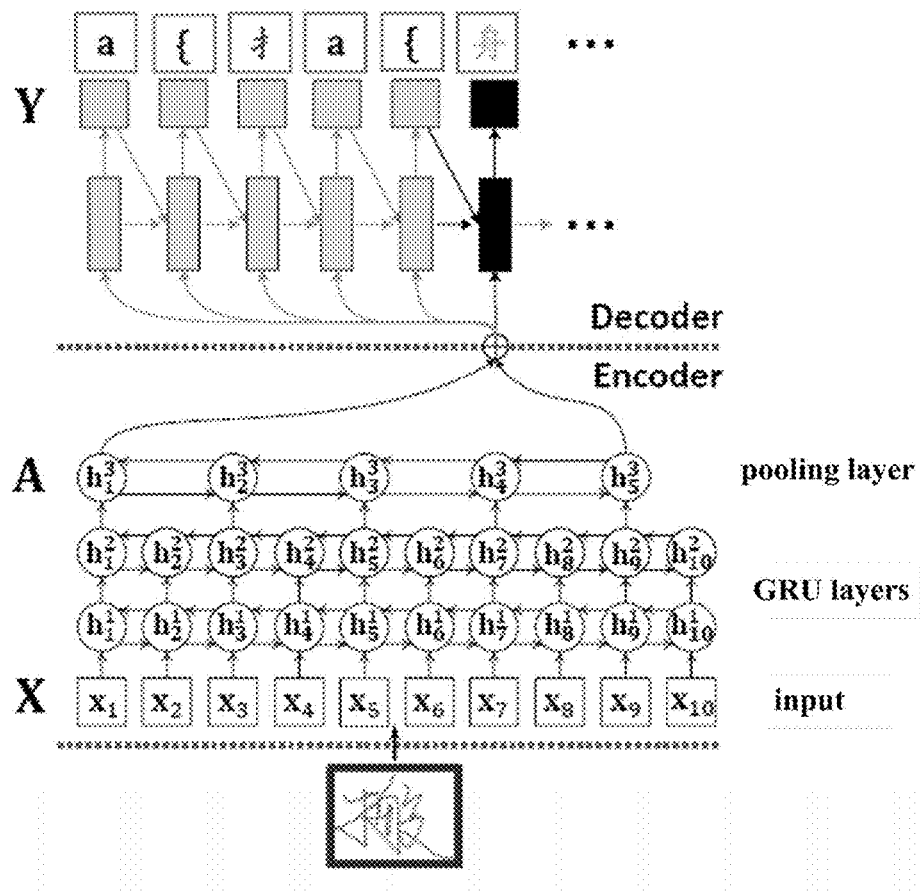
FIG. 5 illustrates a structure of a character recognition model according to an embodiment of the present disclosure.

FIG. 5 illustrates a structure of a character recognition model according to another embodiment of the present disclosure. As shown in FIG. 5, the character recognition model also includes an encoder and a decoder. The encoder firstly receives an input of a character with stroke information and encodes the character into annotation vectors. The decoder then processes the annotation vectors to obtain and output a radical based character recognition result including symbols indicating radicals of the character and a structure of the radicals of the character. The encoder and decoder of the character recognition model are trained jointly.

The encoder of the character recognition model is described in detail below with two embodiments.

In a first embodiment of data of an image without stroke information, the encoder may be implemented as a convolutional neural network (CNN). CNN is a deep and feedforward artificial neural network that is suitable for analyzing visual images. Fully convolutional neural network (FNN) is a kind of CNN that has no fully connected layer after the convolution and pooling layers. In an implementation, the encoder is implemented as a FNN, and in this way the subsequent decoder can be implemented as an attention based decoder that can selectively pay attention to certain pixel of the input image by choosing specific portions from all the visual features extracted by the encoder.

In an implementation, the encoder includes an input layer, a first predetermined quantity of convolutional layers, a second predetermined quantity of pooling layers, and an output layer. the input layer comprises a plurality of input neurons for describing pixels of the input image, the output layer comprises an output neuron for describing annotation vectors of the image, the convolutional layers each performs feature extraction on an output of a previous layer by using at least one predetermined convolution kernel to obtain an output of the convolutional layer itself, and the pooling layers each performs aggregation statistical processing on an output of a previous convolutional layer by using at least one predetermined pooling kernel to obtain an output of the pooling layer itself.

Assuming that the encoder extracts high-level visual representations denoted by a three-dimensional array H×W× D, the encoder outputs L elements each is a D-dimensional annotation vector corresponding to a local regions of the image, where L=H×W. The output of the encoder may be presented as: $A=\{a_1, \ldots a_L\}$, $a_i \in \mathbb{R}^D$.

In a second embodiment of data of a character with stroke information, feature extraction is firstly performed to obtain data of the character with stroke information for being inputted into the encoder.

In an implementation, devices such as a tablet can achieve the function of feature extraction.

In an implementation, during data acquisition of online handwritten character, pen-tip movements and pen states of pen-down or pen-up are acquired and represented as a variable-length sequence of trajectory points $\{[x_1,y_1,s_1], [x_2,y_2,s_2], \ldots [x_N,y_N,s_N]\}$, where N represents the total number of points of the character, $x_i$ and $y_i$ represents coordinates of an i-th point of the character, and $s_i$ represents a pen state, i.e., pen-down and pen-up, of the i-th point of the character. In this way, we can obtain extracted features of the character $M=\{m_1, m_2 \ldots m_N\}=\{[x_1,y_1,s_1], [x_2,y_2,s_2], \ldots [x_N,y_N,s_N]\}$, as the input sequence to the encoder.

However, different writing speed and different portable devices may affect result of the above data acquisition method. Therefore, in an implementation, to address the issue of non-uniform sampling by different writing speed and the size variations of the coordinates on different portable devices, interpolation and normalization are performed on the above variable-length sequence of trajectory points $\{[x_1,y_1,s_1], [x_2,y_2,s_2], \ldots [x_N,y_N,s_N]\}$. For example, the interpolation and normalization to the variable-length sequence of trajectory points may be performed according to the method mentioned in X.-Y. Zhang, F. Yin, Y.-M. Zhang, C.-L. Liu, and Y. Bengio, "Drawing and recognizing Chinese characters with recurrent neural network", IEEE Transactions on Pattern Analysis and Machine Intelligence, 2017. Then we can obtain a 6-dimentional feature vector $m_i$ for an i-th point of the character as: $m_i=[x_i, y_i, \Delta x_i, \Delta y_i, \delta(s_i=s_{i+1}), \delta(s_i \neq s_{i+1})]$, where $\Delta x_i=x_{i+1}-x_i$, $\Delta y_i=y_{i+1}-y_i$, and $\delta(\cdot)=1$ when the condition is true and $\delta(\cdot)=0$ when the condition is false. The last two terms of the vector are flags indicating the state of the pen, i.e., [1,0] and [0,1] represent pend-down and pen-up respectively. For the last point of the character, there is no $x_{i+1}$, $y_{i+1}$, then values of $x_{i+1}$ and $y_{i+1}$ may be determined as the same as $x_i$ and $y_i$. For the last point of the character, there is also no $s_{i+1}$, and the last two terms of the vector can be determined as [0,1] to represent the pen-up state. In this way, we can obtain extracted features M of the character as the input sequence to the encoder:

$$M = (m_1, m_2, \ldots m_N) =$$
$$([x_1, y_1, \Delta x_1, \Delta y_1, \delta(s_1 = s_2), \delta(s_1 \neq s_2)], [x_2, y_2, \Delta x_2, \Delta y_2, \delta(s_2 = s_3),$$
$$\delta(s_2 \neq s_3)], \ldots, [x_{N-1}, y_{N-1}, \Delta x_{N-1}, \Delta y_{N-1}, \delta(s_{N-1} = s_N),$$
$$\delta(s_{N-1} \neq s_N)], [x_N, y_N, 0, 0, 0, 1]), \text{ where } x_i \in \mathbb{R}^d, d = 6.$$

After features M of the character with stroke information are extracted, the extracted features M may be inputted into an encoder to obtain annotation vectors A of the character. In an implementation, the encoder may be implemented as a Recurrent Neural Network (RNN). RNN is a neural network having strong ability in processing sequential signals.

However, a simple RNN has revealed serious problems during training namely vanishing gradient and exploding gradient. Therefore, in an implementation, an improved version of RNN, i.e., gated recurrent unit (GRU) is employed as the encoder. The GRU utilizes an update gate and a reset gate to control the flow of forward information and back ward gradient. A function of an unidirectional GRU is presented as:

$h_t=GRU(m_t,h_{t-1})$, where $h_t$ represents a current GRU hidden state of the GRU, and $h_{t-1}$ represents a previous GRU hidden state of the GRU.

The GRU function can be expanded as follows:

$$z_t = \sigma(W_{xz}m_t + U_{hz}h_{t-1})$$

$$r_t = \sigma(W_{xr}m_t + U_{hr}h_{t-1})$$

$$\tilde{h}_t = \tan h(W_{xh}m_t + U_{rh}(r_t \otimes h_{t-1}))$$

$$h_t = (1-z_t) \otimes h_{t-1} + z_t \otimes \tilde{h}_t$$

where σ represents a sigmoid activation function, ⊗ represents an element-wise multiplication operator, $z_t$, $r_t$ and $\tilde{h}_t$ represents the updated gate, the reset gate and candidate activation, respectively, and $W_{xz}$, $W_{xr}$, $W_{xh}$, $U_{hz}$, $U_{hr}$ and $U_{rh}$ are related weight matrices that are to be trained.

In an implementation, the encoder comprises P stacked unidirectional GRU layers, where P is an integer equal or greater than 2. One GRU layer comprises multiple GRU units. An output of a previous GRU layer is an input of a current GRU layer.

In an implementation, the first unidirectional GRU layer generates a current GRU hidden state of the first unidirectional GRU layer based on the data of the character with the stroke information and a previous GRU hidden state of the first unidirectional GRU layer. Each of other unidirectional GRU layers except for the first bidirectional GRU layer generates a current GRU hidden state of the unidirectional GRU layer itself based on a current GRU hidden state of a previous unidirectional GRU layer outputted from the previous unidirectional GRU layer and a previous GRU hidden state of the unidirectional GRU layer itself. The current GRU hidden state of the last unidirectional GRU layer is used as annotation vectors of the character, to be inputted into the decoder. Functions of the P stacked unidirectional GRU layers may be respectively presented as:

$$h_t^1 = GRU_1(m_t, h_{t-1}^1),$$
$$h_t^2 = GRU_2(h_t^1, h_{t-1}^2)$$

-continued $$h_t^P = GRU_P(h_t^{P-1}, h_{t-1}^P),$$

Therefore, an annotation vector $a_t$ can be obtained as $a_t = h_t^P$. Thus an annotation vector sequence A with length L can be obtained as: $A=\{a_1, \ldots a_L\}=\{h_1^P, \ldots, h_N^P\}$, where $L=N$, $a_i \in \mathbb{R}^D$, and D is the total number of GRU units in the last GRU layer. For the first time of encoding a character, vector $h_{t-1}^i$ may be set to be a zero vector.

However, even if the unidirectional GRU layer can have access to the history of input signals, it does not have the ability of modeling future context. Therefore a stack of bidirectional GRU layers may be used instead of the unidirectional GRU layers. In an implementation, bidirectional GRU layers are used by passing the input vector M through multiple bidirectional GRU layers each composing of two GRU sub-layers running in opposite directions and concatenating their hidden state vectors so that the encoder can use both history and further information.

In an implementation, the encoder comprises P stacked bidirectional GRU layers. Each bidirectional GRU layer comprises two GRU sub-layers running in opposite directions. Each GRU sub-layer comprises multiple GRU units. An output of a previous bidirectional GRU layer is an input of a current bidirectional GRU layer.

In an implementation, the first bidirectional GRU layer generates a current GRU hidden state of the first bidirectional GRU layer based on the data of the character with the stroke information, a previous GRU hidden state of the first bidirectional GRU layer and a next GRU hidden state of the first bidirectional GRU layer. Each of other bidirectional GRU layers except for the first bidirectional GRU layer generates a current GRU hidden state of the bidirectional GRU layer itself based on a current GRU hidden state of a previous bidirectional GRU layer outputted from the previous bidirectional GRU layer, a previous GRU hidden state of the bidirectional GRU layer itself and a next GRU hidden state of the bidirectional GRU layer itself. Functions of the P stacked bidirectional GRU layers may be respectively presented as:

$$h_t^1 = GRU_1(m_t, \overrightarrow{h_{t-1}^1}, \overleftarrow{h_{t+1}^1}),$$

$$h_t^2 = GRU_2(h_t^1, \overrightarrow{h_{t-1}^2}, \overleftarrow{h_{t+1}^2}),$$

...

$$h_t^P = GRU_P(h_t^{P-1}, \overrightarrow{h_{t-1}^P}, \overleftarrow{h_{t+1}^P}),$$

where $h_t^i$ represents a current GRU hidden state of an i-th bidirectional GRU layer of the P stacked bidirectional GRU layers, $GRU_i$ represents a function of the i-th bidirectional GRU layer of the P stacked bidirectional GRU layers, $h_{t-1}^i$ represent a previous GRU hidden state of the i-th bidirectional GRU layer of the P stacked bidirectional GRU layers, and $h_{t-1}^i$ represent a next GRU hidden state of the i-th bidirectional GRU layer of the P stacked bidirectional GRU layers. For the first time of encoding a character, vector $h_{t-1}^i$ may be set to be a zero vector. For the last time of encoding a character, vector $h_{t+1}^i$ may be set to be a zero vector.

In an implementation, an annotation vector $a_t$ can be obtained as $a_t = h_t^P$. Thus an annotation vector sequence A with length L can be obtained as: $A=\{a_1, \ldots a_L\}=$ $\{h_1^P, \ldots, h_N^P\}$, where $L=N$, $a_i \in \mathbb{R}^D$, and D is the total number of GRU units in the last bidirectional GRU layer.

In the above case, the annotation vectors are overly precise and contain much redundant information, increasing burden to the decoder. Therefore, pooling over time axes may be added in high-level GRU layers. In an implementation, in addition to the P stacked bidirectional GRU layers, the encoder further comprises a pooling layer. One pooling operation can reduce half of the output of the encoder. The output of the last GRU layer is inputted into the pooling layer, and the output of the pooling layer is the output of the encoder. In this case, the output of the last GRU layer is further process by the pooling layer to obtain the annotation vectors A. The annotation vectors A can be obtained as $A=\{a_1, \ldots a_L\}=POOL\{h_1^P, \ldots, h_N^P\}$, where $$L = \frac{N}{2}.$$

Since adding a pooling layer, the annotation vectors are not overly precise and thus the decoder attends less since the number of encoder output reduces, leading to improvement of performance. In addition, the pooling operation accelerates the encoding process. The pooling is applied to the last GRU layer by dropping the even output over time.

In an implementation, the encoder comprises four bidirectional GRU layers and a pooling layer. Each bidirectional GRU layer has 250 forward GRU units and 250 backward GRU units.

FIG. 5 illustrates a schematic diagram of the encoder which includes two bidirectional GRU layers and a pooling layer.

Above described two kinds of encoder which are respectively a CNN type encoder and a RNN type encoder. The output of the two kinds of encoder are all represented as annotation vectors $A=\{a_1, \ldots a_L\}$, $a_i \in \mathbb{R}^D$, which are inputted into the decoder of the character recognition model. Details of the decoder will be described below, which can be applied to both the two kinds of encoder.

In an implementation, the decoder is implemented as a RNN. The decoder receives and processes the annotation vectors outputted from the encoder and then outputs a radical based character recognition result comprising symbols indicating radicals of the character and a structure of the radicals of the character. The radical based character recognition result may be represented by $Y=\{y_1, \ldots y_C\}$, $y_i \in \mathbb{R}^K$, where $y_i$ is a symbol indicating a radical or a structure or a brace constraining a single structure, K is the number of total symbols in the vocabulary which includes basic radials, spatial structures and pairs of braces, and C is the length of the output character recognition result. The generation of a character is finished when all radicals of the character are included in the output character recognition result. Continuing with the above example of "殷", the output of the decoder Y={a{st1{冂d{ 士 八}}d{ 几 又}}}.

From the above, in case of the CNN encoder for data of character without stroke information, the length of the annotation vectors inputted into the decoder is fixed while the length C of the output character recognition result Y is variable. In case of the RNN encoder for data of character with stroke information, the length of the annotation vectors inputted into the decoder is variable while the length C of the output character recognition result Y is variable. Therefore, an intermediate fixed-size context vector is needed to associate the fixed-length annotation vector with the variable-length character recognition result or associate the variable-length annotation vector with the variable-length character recognition result. In an implementation, the intermediate fixed-size context vector is generated via weighted summing the annotation vectors. In an embodiment, an attention layer is added into the decoder to convert the annotation vectors into a fixed-size context vector for decoding each symbol of the output. In an implementation, the context vector has a fixed size of 1, and is used for decoding the character recognition result symbol by symbol. Furthermore, the attention layer also produces the weighting coefficients so that the context vector can contain only useful information at each decoding step.

In an implementation, the decoder includes unidirectional Gated Recurrent Unit (GRU) to produce the radical based character recognition results symbol by symbol.

In an implementation, the decoder includes a first unidirectional GRU layer, an attention layer and a second unidirectional GRU layer, to detect the radicals and the two-dimensional structures simultaneously.

The first unidirectional GRU layer generates a prediction of a current GRU hidden state of the first unidirectional GRU layer based on a previous GRU hidden state of the second unidirectional GRU layer outputted from the second unidirectional GRU layer and a previous symbol. The function of the first GRU layer may be represented as:

$$\hat{s}_t = GRU_1(y_{t-1}, s_{t-1})$$

where $\hat{s}_t$ represents the prediction of the current GRU hidden state of the first unidirectional GRU layer, $y_{t-1}$ represents the previous symbol, $s_{t-1}$ represents the previous GRU hidden state of the second unidirectional GRU layer. For decoding the first symbol in the output Y, the previous symbol may be set to be a zero vector.

For decoding the first symbol in the output Y, the previous GRU hidden state is obtained by training via a fully connected layer. Specifically, the decoder further includes a fully connected layer for providing an original state to the first GRU layer, that is, providing the previous GRU hidden state to the first GRU layer for decoding the first symbol in the output Y. The fully connected layer is trained jointly with the whole model. The fully connected layer receives the summation of all annotation vectors outputted from the encoder and converts the dimension D of the summation of annotation vectors to the dimension n of the first GRU layer, to obtain the previous GRU hidden state.

The attention layer generates a context vector based on the prediction of the current GRU hidden state of the first unidirectional GRU layer outputted from the first unidirectional GRU layer and the annotation vectors outputted from the encoder. The function of the attention layer may be represented as:

$$c_t = f_{catt}(\hat{s}_t, A)$$

where $c_t$ represents the intermediate fixed-size context vector.

The second GRU layer generates a current GRU hidden state of the second unidirectional GRU layer based on the context vector outputted from the attention layer and the prediction of the current GRU hidden state of the first unidirectional GRU layer outputted from the first GRU layer. The function of the second unidirectional GRU layer may be represented as:

$$s_t = GRU_2(c_t, \hat{s}_t)$$

where $s_t$ represents the current GRU hidden state of the second unidirectional GRU layer. The current GRU hidden state $s_t$ of the second unidirectional GRU layer will be subsequently inputted into the first GRU layer as the previous GRU hidden state $s_{t-1}$ of the second unidirectional GRU layer.

Then, the decoder computes a probability indicating whether an input is a target symbol based on the context vector, the current GRU hidden state of the second unidirectional GRU layer and the previous symbol. The decoder may computes the probability P using the following equation:

$$P(y_t|y_{t-1}, X) = g(W_o h(E y_{t-1} + W_s s_t + W_c c_t))$$

where $y_t$ represents a target symbol, $y_{t-1}$ represents a previous symbol, X represents the input, g( ) represents a softmax activation function over all the symbols in the vocabulary, h( ) represents a maxout activation function, and E represents an embedding matrix for converting the size of the matrix generated during the processing of the decoder. $W_o$, $W_s$, $W_c$ and E are trained coefficients, where $$W_o \in \mathbb{R}^{K \times \frac{m}{2}}, W_s \in \mathbb{R}^{m \times n}, W_c \in \mathbb{R}^{m \times D},$$

with m representing the dimension of the embedding matrix and n representing the dimension of the first or second unidirectional GRU layer.

As above, the probability indicating whether an input X is a target symbol can be obtained, thus the output Y of the decoder, which indicates the radical based character recognition result, can be obtained.

The decoder performs like a potential language model to grasp the rules of composing the radical based character recognition result after successfully detecting radicals and structures. A pair of braces to constrain a single structure is used in the radical based character recognition result. That is, the radical based character recognition result is in a form of a structure identity {radical . . . radical}. Taking "stl" as an example, the radical based character recognition result is represented as "stl {radical-1 radical-2}". Usually, a structure is described by two different radicals. However, as for some unique structures, they are described by three or more radicals.

In an embodiment, the decoder may decode the character from left to right, from the top to bottom, from right to left, or from bottom to top. However, in a preferred embodiment, the decoder decodes the character from left to right, which conforms to the symbol recognition habit of people.

Details of the attention layer will be described below.

In recognizing radicals or structures, not all information outputted from the encoder is useful. Therefore, in an embodiment, a spatial attention layer is provided to know which part of the output annotation vectors is to be paid with more attention and thus assigned a higher weight.

However, the conventional spatial attention has a problem of lack of coverage. Coverage means overall alignment information that indicating whether pixels of a local part of the input image have been attended or not. The overall alignment information is especially important in recognizing a character because in principle, each radical or structure should be decoded only once. Lacking coverage will lead to misalignment resulting in over-parsing or under-parsing problem. Over-parsing implies that some radicals and structures have been decoded twice or more, while under-parsing denotes that some radicals and structures have never been decoded.

Therefore, in an implementation, a coverage based spatial attention layer is proposed, in which a coverage vector aiming at tracking the past alignment information is provided for the computation of attention. In an implementation, the alignment information is implemented as attention coefficients. The coverage based spatial attention layer performs as weighting coefficients so that it can choose the most relevant parts from the whole input annotation vectors for calculating the context vector.

In an embodiment, the coverage based spatial attention layer is implemented as a multi-layer perceptron (MLP) which includes a convolutional layer and a plurality of fully connected layer. The coverage based spatial attention layer is jointly trained with the encoder and the decoder.

The convolutional layer of the coverage based spatial attention layer generates a coverage vector F based on a previous attention coefficient matrix. The function of the convolutional layer may be represented as:

$$F = Q \times \Sigma_{l=1}^{t-1} \alpha_l$$

where $\alpha_l$ represents the attention coefficient matrix at time 1. Q represents a matrix of the filter of the convolutional layer, Q is determined by the output dimension of the attention layer, i.e., the length of the context vector, the size of the convolution kernel of the convolution layer, and the number of feature maps of the filter of the convolutional layer. The coverage vector F is initialized as a zero vector and is computed based on the summation of all past attention coefficients. For decoding the first symbol in the output Y, the previous attention coefficient matrix may be set to be a zero matrix.

The plurality of fully connected layers generate a current attention coefficient matrix based on the coverage vector outputted from the convolutional layer, the annotation vectors outputted from the encoder, and the prediction of the current GRU hidden state of the first unidirectional GRU layer outputted from the first unidirectional GRU layer. The functions of the convolutional layer may be represented as:

$$e_{ti} = v_{att}^T \tanh(W_{att}\hat{s}_t + U_{att}a_i + U_f f_i)$$

$$\alpha_{ti} = \frac{\exp(e_{ti})}{\sum_{k=1}^{L} \exp(e_{tk})}$$

where $\alpha_{ti}$ represents the attention coefficient matrix at time t for the annotation sequence $a_i$. $e_{ti}$ represents energy of the annotation vector $a_i$ at time step t conditioned on the prediction of current GRU hidden state of the first unidirectional GRU layer $\hat{s}_t$ and the coverage vector $f_i$. $e_{tk}$ represents energy of the annotation vector $a_k$ at time step t conditioned on the prediction of current GRU hidden state of the first unidirectional GRU layer $\hat{s}_t$ and the coverage vector $f_k$. $v_{att}$, $W_{att}$, $U_{att}$ and $U_f$ are trained coefficients, where $v_{att} \in \mathbb{R}^{n'}$, $W_{att} \in \mathbb{R}^{n' \times n}$E, $U_{att} \in \mathbb{R}^{n' \times D}$, and $U_f \in \mathbb{R}^{n' \times M}$, with n' representing output dimension of the attention layer and M representing the number of feature maps of the filter of the convolutional layer.

The attention layer then generates the context vector based on the current attention coefficient matrix and the annotation vectors outputted from the encoder, for example, by using the function as follow:

$$c_t = \sum_{i=1}^{L} \alpha_{ti} a_i$$

The context vector $c_t$ is a fixed-size vector regardless of the input data size. The context vector $c_t$ is utilized by the two unidirectional GRU layers of the decoder to output the radical based character recognition result Y of the input characters one by one. For each symbol in the character recognition result Y, the annotation vectors may have different attention coefficient matrixes to obtain different context vectors $c_t$, for decoding the character recognition result symbol by symbol.

Figure 6:
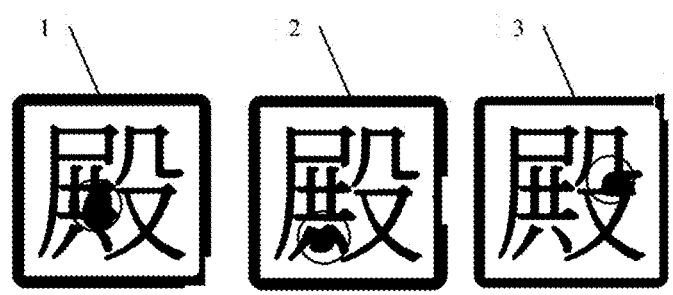
FIG. 6 illustrates examples of attention on radicals and structures.

FIG. 6 illustrates an example of attention on radicals and structures. As shown in FIG. 6, when the part indicated by the circle in the block 1 is attended, a radical of "土" can be obtained; when the part indicated by the circle in the block 2 is attended, a radical of "八" can be obtained; and when the part indicated by the circle in the block 3 is attended, a structure of "d" as a top-bottom structure can be obtained. Therefore, the attention coefficients corresponding to the parts of circles can be greater than that of other part.

Figure 7:
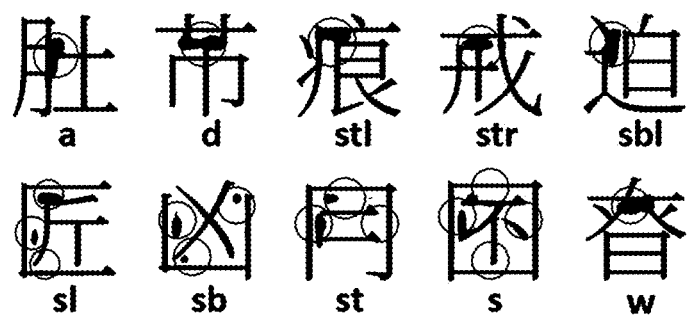
FIG. 7 illustrates examples of attention on structures.
Figure 8:
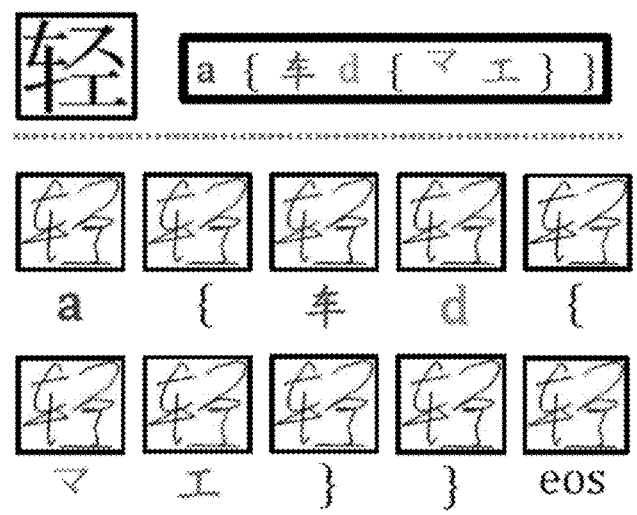
FIG. 8 illustrates an example of attention visualization.

FIG. 7 illustrates examples of attention on structures. FIG. 7 schematically illustrates parts of characters needed to be attended for each structure by using circles. FIG. 8 schematically illustrates an example of attention visualization. In FIG. 8, above the dotted line, there is one Chinese character class and its corresponding character recognition result; below the dotted line, there are images denoting the visualization of attention probabilities during decoding procedure. The trajectory of input handwritten character is drawn in a two-dimensional greyscale image to visualize attention. Below images there are corresponding symbols generated by the decoder at each decoding step. As we can see from FIG. 8, when encountering basic radicals, the attention layer generates the alignment well corresponding to human intuition. Also, it mainly focuses on the ending of the last radical and the beginning of the next radical to detect a spatial structure. Take "d" as an example, by attending to the ending of the last radical and the beginning of the next radical, the attention layer detects a top-bottom direction, therefore a top-bottom structure is analyzed. Immediately after generating a spatial structure, the decoder produces a pair of braces { }, which are employed to constrain the two-dimensional structure in Chinese character output result.

Two specific examples of the character recognition model for case of data of character without stroke information are provided below.

In the first example, the encoder of the character recognition model employs VisualGeometryGroup (VGG) 14 architecture. The VGG14 includes a first block including three stacked convolutional layers, a first max-pooling layer, a second block including three stacked convolutional layers, a second max-pooling layer, a third block including four stacked convolutional layers, a third max-pooling layer, a fourth block including four stacked convolutional layers, and a fourth max-pooling layer. The number of output channels of each convolutional layer in the same block is the same. The decoder includes two unidirectional GRU layers and a coverage based spatial attention layer including a convolutional layer and a plurality of fully connected layers. Each unidirectional GRU layer of the decoder is a single layer with 256 forward GRU units. The dimension m of the embedding matrix E, the dimension n of the first GRU layer and the dimension n of the second GRU layer are set to 256. The output dimension n' of the attention layer is set to the annotation dimension D. The size of the convolution kernel size of the attention layer is set to 5*5, and the number of features maps M is set to 256.

In the training stage of the above character recognition model, cross-entropy (CE) is used as the loss function and an adadelta algorithm with gradient clipping for optimization is adopted. In the texting stage after training, a beam search algorithm with the beam size being 10 is employed to complete the decoding process.

Figure 9:
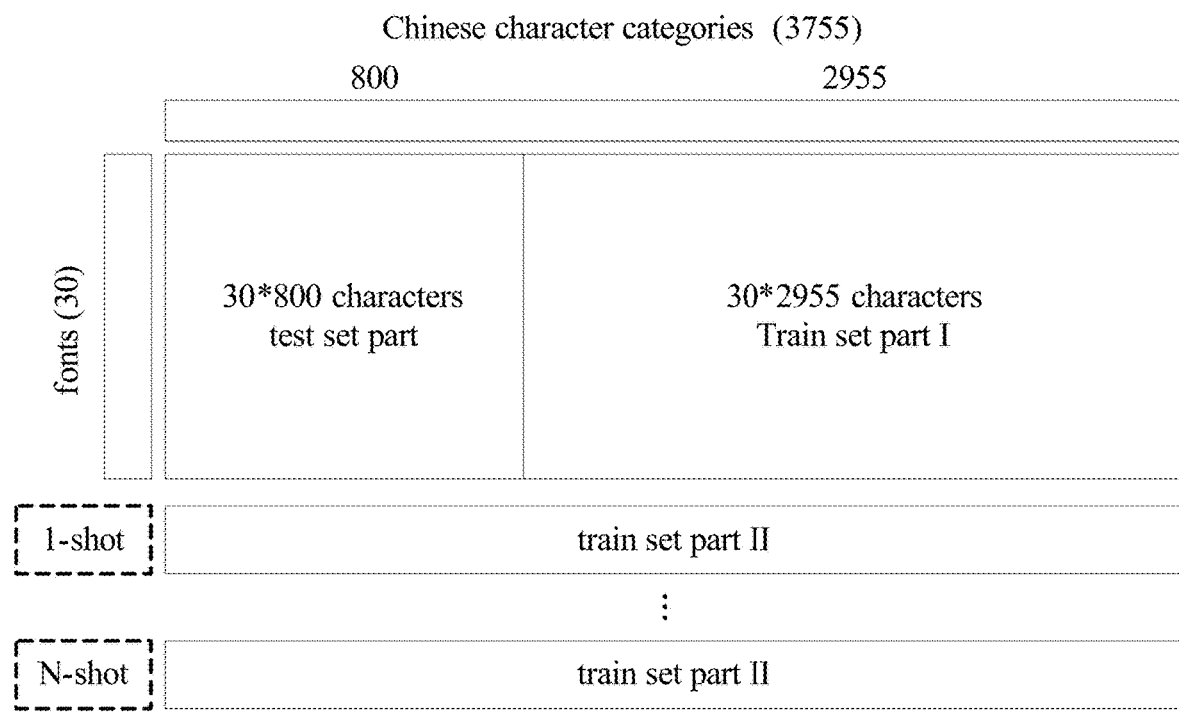
FIG. 9 illustrates an implementation of organizing a training set and a testing set according to an embodiment of the disclosure.
Figure 10:
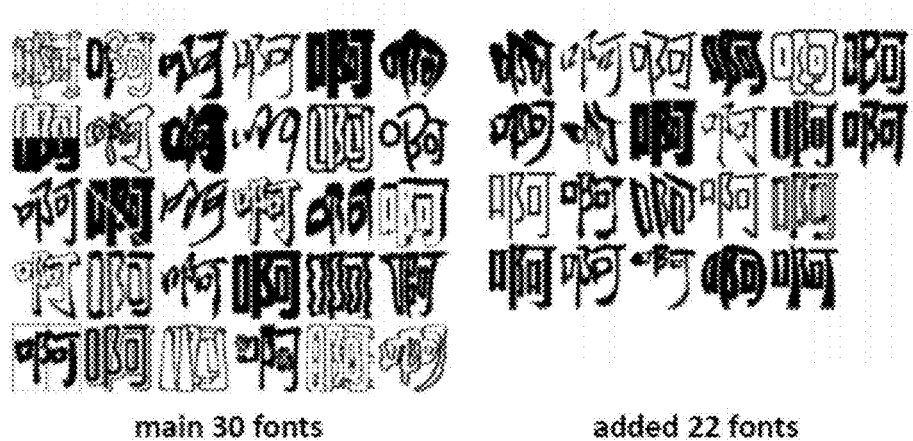
FIG. 10 illustrates an example of font styles of a character.

Specifically, in an experiment on the first example of the character recognition model, the training set contains 3755 common used Chinese character categories and the testing set contains 800 character categories. FIG. 9 illustrates the implementation of organizing the training set and the testing set. We design this experiment like few-shot learning of Chinese character recognition. The 3755 characters are divided into 2955 characters and other 800 characters. The 800 characters with 30 various font styles form the testing set and the other 2955 characters with the same 30 font styles become a part of training set. Additionally, 3755 characters with other font styles are used as a second part of training set. When we add 3755 characters with other N font styles as the second training set, we call this experiment N-shot. The number of font styles of the second part of training set increased from 1 to 22. The description of main 30 font styles and newly added 22 font styles are visualized in FIG. 10.

Figure 11:
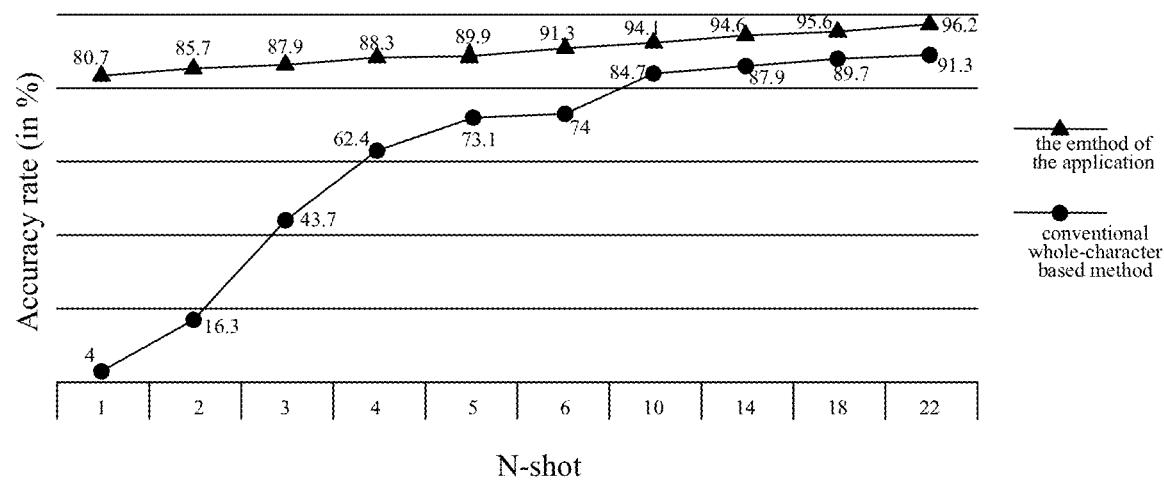
FIG. 11 illustrates comparison in accuracy rate between a conventional whole-character based method and the method for recognizing a character according to an embodiment of the present disclosure.

FIG. 11 illustrates the comparison between the conventional whole-character based method and the method for recognizing characters according to the present disclosure, when the number of training samples of seen classes increases. We can see that the method according to the present disclosure consistently outperforms the conventional whole-character based method.

The second example of the character recognition model is different from the first example in that the VGG 14 is replaced with VGG14-s, for a smaller training set. In VGG14-s, the number of output channels in each block is (32, 64, 128, 256).

Specifically, in an experiment on the second example of the character recognition model, the effectiveness of the character recognition model on identifying unseen Chinese characters through accuracy rate and attention visualization are considered. A test character is considered as successfully recognized only when its predicted caption exactly matches the ground-truth.

Figure 12:
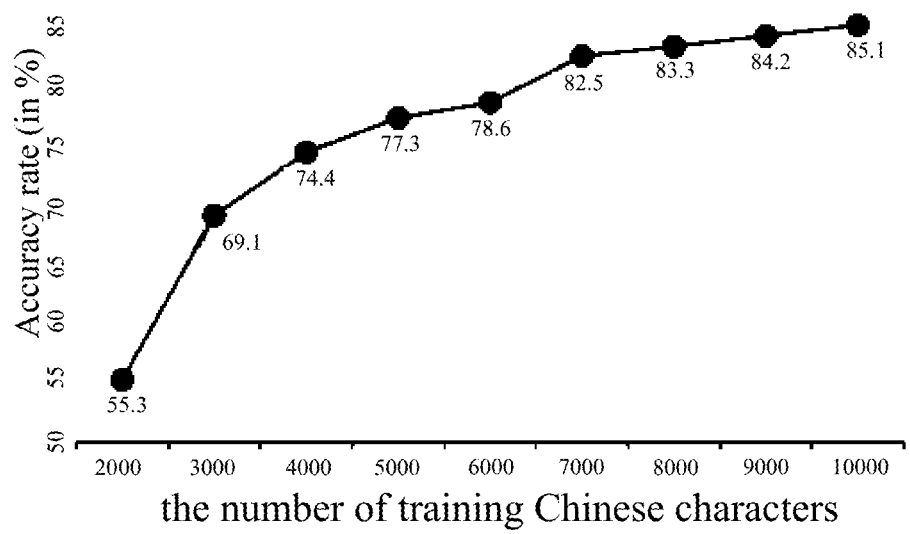
FIG. 12 illustrates an example of an accuracy rate of recognizing unseen Chinese characters according to the method for recognizing a character of the present disclosure.

In this experiment, 26,079 Chinese characters in Song font style which are composed of only 361 radicals and 29 spatial structures are used. These characters are divided into a training set, a validation set and a testing set. The training set is increased from 2,000 to 10,000 Chinese characters to see how many training characters are enough to train our model to recognize the unseen 16,079 characters. As for the unseen 16,079 Chinese characters, 2,000 characters are selected as the validation set and 14,079 characters are selected as the testing set. An ensemble method is employed during the testing procedure because the performances vary severely due to the small training set. FIG. 12 illustrates the performance where 2,000 training Chinese characters can successfully recognize 55.3% unseen 14,079 Chinese characters and 10,000 training Chinese characters. Actually, only about 500 Chinese characters are adequate to cover overall Chinese radicals and spatial structures.

Figures 13, 14:
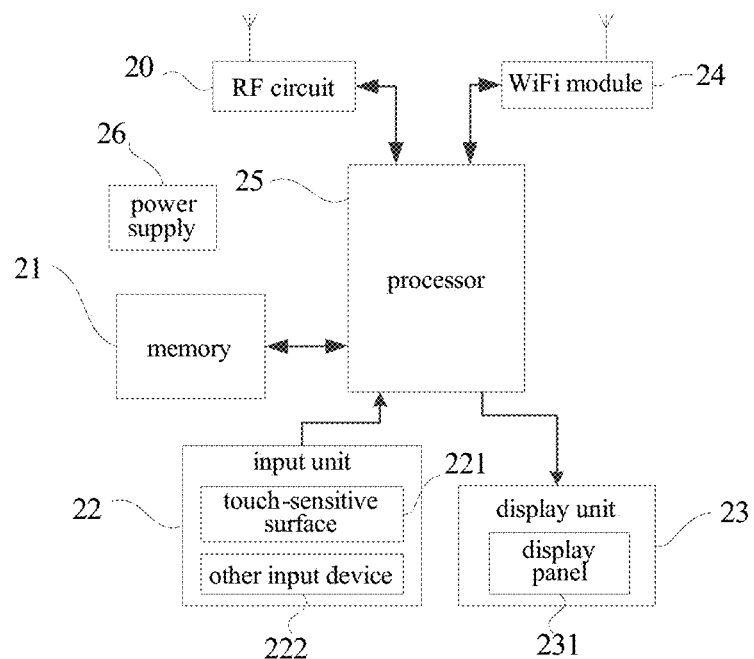
FIG. 13 illustrates an example of a process of recognizing an unseen Chinese character according to an embodiment of the method for recognizing a character of the present disclosure.
FIG. 14 illustrates a structural schematic diagram of a computer by which the method for recognizing a character according to the embodiment of the present disclosure is performed according to an embodiment of the present disclosure.

FIG. 13 illustrates that how the character recognition model learns to recognize an unseen Chinese character from an image into a radical based character recognition result step by step. When encountering basic radicals, the attention model well generates the alignment strongly corresponding to the human intuition. Also, it successfully generates the structure "a" and "d" when it detects a left-right direction and a top-bottom direction. Immediately after detecting a spatial structure, the decoder generates a pair of braces "{ }", which is employed to constrain the structure in Chinese character caption.

In an embodiment, the character recognition model can be used to recognize one character in an image, and can be used to recognize more characters in an image one by one. In case of multiple characters, the encoder encoders the characters at one time to obtain the output A, and the decoder decoders the multiple characters word by word by obtain multiple Y.

In an embodiment, the image including the character may be obtained from a storage, and after the character is recognized, the radical based character recognition result may be stored in the storage to replace the image.

The storage space for storing the radical based character recognition result is smaller than the storage space for storing the image, which results in a less storage space for character information. Accordingly, for subsequent process, data amount for transmitting the character information and processing the character information is significantly reduced.

Another specific example of the character recognition model for case of data of character with stroke information is provided below.

The encoder comprises four bidirectional GRU layers and a pooling layer. Each bidirectional GRU layer has 250 forward GRU units and 250 backward GRU units. The decoder includes two unidirectional GRU layers and a coverage based spatial attention layer including a convolutional layer and a plurality of fully connected layers. Each unidirectional GRU layer of the decoder is a single layer with 256 forward GRU units. The dimension m of the embedding matrix E, the dimension n of the first GRU layer and the dimension n of the second GRU layer, and the output dimension n' of the attention layer are all set to 256. The convolution kernel size for computing the coverage vector is set to (5*1) as it is a one-dimensional convolution operation, while the number of convolution filter is set to 256.

The training objective of the character recognition model is to maximize the predicted symbol probability $P(y_t|y_{t-1}, X)=g(W_o h(Ey_{t-1}+W_s s_t+W_c c_t))$. In the training stage of the above character recognition model, a cross-entropy (CE) is used as the objective function: $O=-\Sigma_{t=1}^{C} \log p(w_t|y_{t-1},X)$, where $w_t$ represents the ground truth word at time step t, C is the length of output string. An adadelta algorithm with gradient clipping for optimization is adopted. The adadelta gyperparameters are set as $\rho=0.95$, $\varepsilon=10^{-8}$.

In the decoding stage, we aim to generate a most likely character caption given the input trajectory:

$$\hat{y} = \underset{y}{\mathrm{argmax}} \log P(y \mid X).$$

However, different from the training procedure, we do not have the ground truth of previous predicted word. To prevent previous prediction errors inherited by next decoding step, a simple left-to-right beam search algorithm is employed to implement the decoding procedure. Here, we maintained a set of 10 partial hypotheses beginning with the start-of-sentence <sos>. At each time step, each partial hypothesis in the beam is expanded with every possible word and only the 10 most likely beams are kept. This procedure is repeated until the output word becomes the end-of sentence <sos>.

A first experiment on the above character recognition model where seen Chinese character classes are testing data is described. The set of character class is 3755 commonly used Characters. The dataset used for training is the CASIA dataset including OLHWDB1.0 and OLHWDB1.1. There are totally 2,693,183 samples for training and 224,590 samples for testing. The training and testing data were produced by different writers with enormous handwriting styles across individuals. The character recognition model of the present disclosure achieved an accuracy of 96.43%, with less size of radical vocabulary and thus yielding decrease of redundancy among output classes and improvement of recognition performance.

A second experiment on the above character recognition model where unseen Chinese character classes are testing data is described. The number of Chinese character classes is not fixed as more and more novel characters are being created. Traditional non-radical based methods are incapable of recognizing these unseen characters since the objective character class has never been seen during training procedure. However the character recognition model of the present disclosure is able to recognize unseen Chinese characters only if the radicals composing unseen characters have been seen. To validate the performance of the character recognition model of the present disclosure on recognizing unseen Chinese character classes, we divide 3755 common Chinese characters into 3255 classes and the other 500 classes. We choose handwritten characters belonging to 3255 classes from original training set as the new training set and we choose handwritten characters belonging to the other 500 classes from original testing set as the new testing set. By doing so, both the testing character classes and handwriting variations have never been seen during training. We explore different size of training set to train the character recognition model of the present disclosure, ranging from 500 to 3255 Chinese character classes and we make sure the radicals of testing characters are covered in training set.

We can see in Table 1 that the character recognition model of the present disclosure achieves a character accuracy of 60.37% which is a relatively pleasant performance compared with traditional recognition systems as they cannot recognize unseen Chinese character classes which means their accuracies are definitely 0%.

TABLE 1

Results on Newly Divided Testing Set based on CASIA Dataset of Handwritten Unseen Chinese Character Recognition, Testing Set Contains 500 Chinese Character Classes

| Train classes | Train samples | Test accuracy |
| --- | --- | --- |
| 500 | 359,036 | — |
| 1000 | 717,194 | 10.74% |
| 1500 | 1,075,344 | 26.02% |
| 2000 | 1,435,295 | 39.35% |
| 2753 | 1,975,972 | 50.45% |
| 3255 | 2,335,433 | 60.37% |

Above discloses a method for recognizing a character. The method for recognizing a character can be applied to various fields.

In an embodiment, the method is applied to machine translation. After the character is recognized based on the radical based character recognition result, the recognized character is translated into another language and the translated character is output. For example, in a foreign restaurant, a menu is shot by a camera and inputted into the character recognition model or a user handwrites the menu onto a tablet which is then inputted into the character recognition model, and after the character is recognized by the character recognition model, translation is performed on the recognized characters and the translated characters are output, and then people can order dishes using the outputted and translated characters. For another example, in a road of a foreign country, a road sign is shot by a camera and inputted into the character recognition model or a user handwrites words on the road sign onto a tablet which is then inputted into the character recognition model, and after the character is recognized by the character recognition model, translation is performed on the recognized characters and the translated characters are output, and then people can drive the car according to the outputted and translated characters.

In an embodiment, the method is applied to text-voice conversion. After the character is recognized based on the radical based character recognition result, the recognized character is processed and converted into a voice and the voice is output. For example, when people of bad eyesight or people who is inconvenience to see, wants to know some information, he can shot the information by a camera which is then inputted into the character recognition model, or when people wants to know pronunciation of a word, he can handwrite the word onto a tablet which is then inputted into the character recognition model, and after the character is recognized by the character recognition model, text-voice conversion is performed on the recognized characters and the voice is output, and then people can know the information and thus do some actions by listening to the voice.

In an embodiment, the method is applied to human-computer interaction. For example, a character is inputted into a terminal including the character recognition model, and after the character is recognized by the character recognition model, the character may be used as a key word for automatic search in, for example, baidu or google. For another example, a character is inputted into a terminal including the character recognition model, and after the character is recognized by the character recognition model, the character may be used as an instruction to the terminal, and the terminal conducts corresponding actions in response to the instruction.

According to an embodiment of the application, an apparatus for recognizing a character is also provided. The apparatus may be, for example, a computer. The apparatus includes a processor and a non-transitory storage medium having a plurality of instructions stored thereon that, when executed by the processor, cause the processor to perform the above method for recognizing a character.

Specifically, the apparatus for recognizing a character includes a processor and a non-transitory storage medium having a plurality of instructions stored thereon that, when executed by the processor, cause the processor to:

obtain a character;

convert the character into a radical based character recognition result, wherein the radical based character recognition result comprises symbols indicating radicals of the character and a structure of the radicals of the character; and recognize the character based on the radical based character recognition result.

In an embodiment, converting the character into the radical based character recognition result comprises: inputting the character into a character recognition model to obtain the radical based character recognition result, wherein the character recognition model is obtained by training on a set of samples, and wherein the character recognition model comprises an encoder and a decoder.

In an embodiment, inputting the character into the character recognition model comprises inputting data of an image including the character into the encoder of the character recognition model, and the encoder comprises a convolutional neural network.

In an embodiment, the encoder comprises a full convolutional neural network, the full convolutional neural network comprises an input layer, a first predetermined quantity of convolutional layers, a second predetermined quantity of pooling layers, and an output layer.

The input layer comprises a plurality of input neurons for describing pixels of the image, the output layer comprises an output neuron for describing annotation vectors of the image, the convolutional layers each performs feature extraction on an output of a previous layer by using at least one predetermined convolution kernel to obtain an output of the convolutional layer itself, and the pooling layers each performs aggregation statistical processing on an output of a previous convolutional layer by using at least one predetermined pooling kernel to obtain an output of the pooling layer itself.

In an embodiment, inputting the character into the character recognition model comprises obtaining data of the character with stroke information and inputting the data of the character with the stroke information into the encoder of the character recognition model, wherein the stroke information comprises pen-down or pen-up information of each point of the character, and wherein the encoder comprises a recurrent neural network (RNN).

In an embodiment, the encoder comprises a predetermined number of stacked bidirectional Gated Recurrent Unit (GRU) layers, where the first bidirectional GRU layer generates a current GRU hidden state of the first bidirectional GRU layer based on the data of the character with the stroke information, a previous GRU hidden state of the first bidirectional GRU layer and a next GRU hidden state of the first bidirectional GRU layer; and each of other bidirectional GRU layers except for the first bidirectional GRU layer generates a current GRU hidden state of the bidirectional GRU layer itself based on a current GRU hidden state of a previous bidirectional GRU layer outputted from the previous bidirectional GRU layer, a previous GRU hidden state of the bidirectional GRU layer itself and a next GRU hidden state of the bidirectional GRU layer itself, where the current GRU hidden state of the last bidirectional GRU layer is used as annotation vectors of the character, to be inputted into the decoder.

In an embodiment, the encoder comprises a predetermined number of stacked bidirectional GRU layers and a pooling layer, where the first bidirectional GRU layer generates a current GRU hidden state of the first bidirectional GRU layer based on the data of the character with the stroke information, a previous GRU hidden state of the first bidirectional GRU layer and a next GRU hidden state of the first bidirectional GRU layer; each of other bidirectional GRU layers except for the first bidirectional GRU layer generates a current GRU hidden state of the bidirectional GRU layer itself based on a current GRU hidden state of a previous bidirectional GRU layer outputted from the previous bidirectional GRU layer, a previous GRU hidden state of the bidirectional GRU layer itself and a next GRU hidden state of the bidirectional GRU layer itself; and the pooling layer generates annotation vectors of the character, to be inputted into the decoder, based on the current GRU hidden state of the last bidirectional GRU layer.

In an embodiment, the decoder comprises a first unidirectional GRU layer, an attention layer and a second unidirectional GRU layer, where the first unidirectional GRU layer generates a prediction of a current GRU hidden state of the first unidirectional GRU layer based on a previous GRU hidden state of the second unidirectional GRU layer outputted from the second unidirectional GRU layer and a previous symbol, where the attention layer generates a context vector based on the prediction of the current GRU hidden state of the first unidirectional GRU layer outputted from the first unidirectional GRU layer and annotation vectors outputted from the encoder, where the second unidirectional GRU layer generates a current GRU hidden state of the second unidirectional GRU layer based on the context vector outputted from the attention layer and the prediction of the current GRU hidden state of the first unidirectional GRU layer outputted from the first unidirectional GRU layer, and where the decoder further generates a probability indicating whether an input is a target symbol based on the context vector, the current GRU hidden state of the second unidirectional GRU layer and the previous symbol.

In an embodiment, the attention layer comprises a convolutional layer and a plurality of fully connected layers. The convolutional layer generates a coverage vector based on a previous attention coefficient matrix. The plurality of fully connected layers generate a current attention coefficient matrix based on the coverage vector outputted from the convolutional layer, the annotation vectors outputted from the encoder and the prediction of the current GRU hidden state of the first unidirectional GRU layer outputted from the first unidirectional GRU layer. The attention layer further generates the context vector based on the current attention coefficient matrix and the annotation vectors outputted from the encoder.

In an embodiment, the radical based character recognition result is in a form of a structure identity {radical . . . radical}. The structure identity comprises a symbol indicating a left-right structure, a symbol indicating a top-bottom structure, a symbol indicating a top-left-surround structure, a symbol indicating a top-right-surround structure, a symbol indicating a bottom-left-surround structure, a symbol indicating a left-surround structure, a symbol indicating a bottom-surround structure, a symbol indicating a top-surround structure, a symbol indicating a surround structure, or a symbol indicating a within structure.

According to an embodiment of the application, a computer readable storage medium storing a computer program is further provided. When the computer program is executed, the above method for recognizing a character is implemented.

Specifically, the storage medium stores a computer program, where the computer program comprises a plurality of computer-readable instructions that, when executed by a computer, cause the computer to:

obtain a character;

convert the character into a radical based character recognition result, wherein the radical based character recognition result comprises symbols indicating radicals of the character and a structure of the radicals of the character; and recognize the character based on the radical based character recognition result.

In an embodiment, converting the character into the radical based character recognition result comprises: inputting the character into a character recognition model to obtain the radical based character recognition result, wherein the character recognition model is obtained by training on a set of samples, and wherein the character recognition model comprises an encoder and a decoder.

In an embodiment, inputting the character into the character recognition model comprises inputting data of an image including the character into the encoder of the character recognition model, and the encoder comprises a convolutional neural network.

In an embodiment, the encoder comprises a full convolutional neural network, the full convolutional neural network comprises an input layer, a first predetermined quantity of convolutional layers, a second predetermined quantity of pooling layers, and an output layer.

The input layer comprises a plurality of input neurons for describing pixels of the image, the output layer comprises an output neuron for describing annotation vectors of the image, the convolutional layers each performs feature extraction on an output of a previous layer by using at least one predetermined convolution kernel to obtain an output of the convolutional layer itself, and the pooling layers each performs aggregation statistical processing on an output of a previous convolutional layer by using at least one predetermined pooling kernel to obtain an output of the pooling layer itself.

In an embodiment, inputting the character into the character recognition model comprises obtaining data of the character with stroke information and inputting the data of the character with the stroke information into the encoder of the character recognition model, wherein the stroke information comprises pen-down or pen-up information of each point of the character, and wherein the encoder comprises a recurrent neural network (RNN).

In an embodiment, the encoder comprises a predetermined number of stacked bidirectional Gated Recurrent Unit (GRU) layers, where the first bidirectional GRU layer generates a current GRU hidden state of the first bidirectional GRU layer based on the data of the character with the stroke information, a previous GRU hidden state of the first bidirectional GRU layer and a next GRU hidden state of the first bidirectional GRU layer; and each of other bidirectional GRU layers except for the first bidirectional GRU layer generates a current GRU hidden state of the bidirectional GRU layer itself based on a current GRU hidden state of a previous bidirectional GRU layer outputted from the previous bidirectional GRU layer, a previous GRU hidden state of the bidirectional GRU layer itself and a next GRU hidden state of the bidirectional GRU layer itself, where the current GRU hidden state of the last bidirectional GRU layer is used as annotation vectors of the character, to be inputted into the decoder.

In an embodiment, the encoder comprises a predetermined number of stacked bidirectional GRU layers and a pooling layer, where the first bidirectional GRU layer generates a current GRU hidden state of the first bidirectional GRU layer based on the data of the character with the stroke information, a previous GRU hidden state of the first bidirectional GRU layer and a next GRU hidden state of the first bidirectional GRU layer; each of other bidirectional GRU layers except for the first bidirectional GRU layer generates a current GRU hidden state of the bidirectional GRU layer itself based on a current GRU hidden state of a previous bidirectional GRU layer outputted from the previous bidirectional GRU layer, a previous GRU hidden state of the bidirectional GRU layer itself and a next GRU hidden state of the bidirectional GRU layer itself; and the pooling layer generates annotation vectors of the character, to be inputted into the decoder, based on the current GRU hidden state of the last bidirectional GRU layer.

In an embodiment, the decoder comprises a first unidirectional GRU layer, an attention layer and a second unidirectional GRU layer, where the first unidirectional GRU layer generates a prediction of a current GRU hidden state of the first unidirectional GRU layer based on a previous GRU hidden state of the second unidirectional GRU layer outputted from the second unidirectional GRU layer and a previous symbol, where the attention layer generates a context vector based on the prediction of the current GRU hidden state of the first unidirectional GRU layer outputted from the first unidirectional GRU layer and annotation vectors outputted from the encoder, where the second unidirectional GRU layer generates a current GRU hidden state of the second unidirectional GRU layer based on the context vector outputted from the attention layer and the prediction of the current GRU hidden state of the first unidirectional GRU layer outputted from the first unidirectional GRU layer, and where the decoder further generates a probability indicating whether an input is a target symbol based on the context vector, the current GRU hidden state of the second unidirectional GRU layer and the previous symbol.

In an embodiment, the attention layer comprises a convolutional layer and a plurality of fully connected layers. The convolutional layer generates a coverage vector based on a previous attention coefficient matrix. The plurality of fully connected layers generate a current attention coefficient matrix based on the coverage vector outputted from the convolutional layer, the annotation vectors outputted from the encoder and the prediction of the current GRU hidden state of the first unidirectional GRU layer outputted from the first unidirectional GRU layer. The attention layer further generates the context vector based on the current attention coefficient matrix and the annotation vectors outputted from the encoder.

In an embodiment, the radical based character recognition result is in a form of a structure identity {radical . . . radical}. The structure identity comprises a symbol indicating a left-right structure, a symbol indicating a top-bottom structure, a symbol indicating a top-left-surround structure, a symbol indicating a top-right-surround structure, a symbol indicating a bottom-left-surround structure, a symbol indicating a left-surround structure, a symbol indicating a bottom-surround structure, a symbol indicating a top-surround structure, a symbol indicating a surround structure, or a symbol indicating a within structure.

FIG. 14 illustrates a structural schematic diagram of a computer by which the method for recognizing a character according to the present disclosure is performed, according to an embodiment of the disclosure.

The computer may include, for example, a Radio Frequency (RF) circuit 20, a memory 21 including one or more computer readable storage mediums, an input unit 22, a display unit 23, a wireless fidelity (WiFi) module 24, a processor 25 including one or more processing cores and a power supply 26. It can be understood by those skilled in the art that, the computer is not limited to the structure of the computer shown in FIG. 14, and the computer may include more or less components, or combined components, or different-arranged components compared with those shown in FIG. 14.

The RF circuit 20 may be used to receive and transmit signals in information receiving and transmitting. Specifically, the received information is delivered to one or more processor 25 to be processed. Generally, the RF circuit 20 includes but not limited to an antenna, at least one amplifier, a tuner, one or more oscillators, a transceiver, a coupler, a Low Noise Amplifier (LNA), and a duplexer. In addition, the RF circuit 20 may communicate with other devices via wireless communication and network. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, and Short Messaging Service (SMS).

The memory 21 may be used to store software programs and modules, and the processor 25 may execute various function applications and data processing by running the software programs and modules stored in the memory 21. The memory 21 may mainly include a program storage area and a data storage area, where the program storage area may be used to store, for example, the operating system and the application program required by at least one function, and the data storage area may be used to store, for example, data established according to the use of the computer. In addition, the memory 21 may include a high-speed random access memory and a nonvolatile memory, such as at least one magnetic disk memory, a flash memory, or other volatile solid-state memory. Accordingly, the memory 21 may also include a memory controller to provide access to the memory 21 for the processor 25 and the input unit 22.

The input unit 22 may be used to receive input numeric or character information, and to generate a keyboard, a mouse, a joystick, an optical or trackball signal input related to user setting and function control. In a specific embodiment, the input unit 22 may include a touch-sensitive surface 221 and other input device 222. The touch-sensitive surface 221 is also referred to as a touch display screen or a touch pad, and may collect a touch operation thereon or thereby (for example, an operation on or around the touch-sensitive surface 221 that is made by the user with a finger, a touch pen and any other suitable object or accessory), and drive corresponding connection devices according to a preset procedure. Optionally, the touch-sensitive surface 221 may include a touch detection device and a touch controller. The touch detection device detects touch direction of the user, detects a signal generated by the touch operation, and transmits the signal to the touch controller. The touch controller receives touch information from the touch detection device, converts the touch information into touch coordinates and transmits the touch coordinates to the processor 25. The touch controller is also able to receive a command transmitted from the processor 25 and execute the command. In addition, the touch-sensitive surface 221 may be implemented by, for example, a resistive surface, a capacitive surface, an infrared surface and a surface acoustic wave surface. In addition to the touch-sensitive surface 221, the input unit 22 may also include other input device 222. Specifically, the other input device 222 may include but not limited to one or more of a physical keyboard, a function key (such as a volume control button, a switch button), a trackball, a mouse and a joystick.

The display unit 23 may be used to display information input by the user or information provided for the user and various graphical user interfaces (GUI) of the computer, these GUIs may be formed by a graph, a text, an icon, a video and any combination thereof. The display unit 23 may include a display panel 231. Optionally, the display panel 231 may be formed in a form of a Liquid Crystal Display (LCD), an Organic Light-Emitting Diode (OLED) or the like. In addition, the display panel 231 may be covered by the touch-sensitive surface 221. When the touch-sensitive surface 221 detects a touch operation thereon or thereby, the touch-sensitive surface 221 transmits the touch operation to the processor 25 to determine the type of the touch event, and then the processor 25 provides a corresponding visual output on the display panel 231 according to the type of the touch event. Although the touch-sensitive surface 221 and the display panel 231 implement the input and output functions as two separate components in FIG. 14, the touch-sensitive surface 221 and the display panel 231 may be integrated together to implement the input and output functions in other embodiment.

WiFi is a short-range wireless transmission technique. The computer may, for example, send and receive E-mail, browse a webpage and access a streaming media for the user by the WiFi module 24, and provide wireless broadband Internet access for the user. Although the WiFi module 24 is shown in FIG. 14, it can be understood that the WiFi module 24 is not necessary for the computer, and may be omitted as needed within a scope of the essence of the disclosure.

The processor 25 is a control center of the computer, which connects various parts of the mobile phone by using various interfaces and wires, and implements various functions and data processing of the computer by running or executing the software programs and/or modules stored in the memory 21 and invoking data stored in the memory 21, thereby monitoring the mobile phone as a whole. Optionally, the processor 25 may include one or more processing cores. Preferably, an application processor and a modem processor may be integrated into the processor 25. The application processor is mainly used to process, for example, an operating system, a user interface and an application program. The modem processor is mainly used to process wireless communication. It can be understood that, the above modem processor may not be integrated into the processor 25.

The computer also includes a power supply 26 (such as a battery) for powering various components. Preferably, the power supply may be logically connected with the processor 25 via a power management system, therefore, functions such as charging, discharging and power management are implemented by the power management system. The power supply 26 may also include one or more of a DC or AC power supply, a recharging system, a power failure detection circuit, a power converter or an inverter, a power status indicator and any other assemblies.

Although not shown, the computer may also include other modules, which are not described herein. Specifically, in the embodiment, the processor 25 in the computer may execute one or more processes of the application program stored in the memory 21 according to the following instructions, to achieve various functions:

obtaining a character;

converting the character into a radical based character recognition result, wherein the radical based character recognition result comprises symbols indicating radicals of the character and a structure of the radicals of the character; and recognizing the character based on the radical based character recognition result.

It should be understood that the specific implementation of the apparatus and the computer readable storage medium for recognizing characters may be achieved by referring to the related method embodiments as described above, which is not repeated herein.

It should be further noted that, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

The steps of the methods or algorithms described in conjunction with the embodiments of the present disclosure can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the technical field.

The foregoing embodiments are only preferred embodiments of the present disclosure and are not meant to limit the present disclosure. The preferred embodiments according to the present disclosure are disclosed above, and are not intended to limit the present disclosure. Those skilled in the art may make, based on the disclosed method and technical content, some variations and improvements on the technical solutions of the present disclosure, or make some equivalent variations on the embodiments without departing from the scope of the technical solutions. All simple modifications, equivalent variations and improvements made based on the technical essence fall within the scope of the technical solutions of the present disclosure.

What is claimed is:

1. A method for recognizing a character, comprising:
   obtaining a character;
   converting the character into a radical based character recognition result, wherein the radical based character recognition result comprises symbols indicating radicals of the character and a structure of the radicals of the character; and
   recognizing the character based on the radical based character recognition result,
   wherein the radical based character recognition result is in a form of a structure identity {radical . . . radical},
   wherein the structure identity comprises a symbol indicating a left-right structure, a symbol indicating a top-bottom structure, a symbol indicating a top-left-surround structure, a symbol indicating a top-right-surround structure, a symbol indicating a bottom-left-surround structure, a symbol indicating a left-surround structure, a symbol indicating a bottom-surround structure, a symbol indicating a top-surround structure, a symbol indicating a surround structure, or a symbol indicating a within structure.

2. The method according to claim 1, wherein converting the character into the radical based character recognition result comprises: inputting the character into a character recognition model to obtain the radical based character recognition result, wherein the character recognition model is obtained by training on a set of samples, and wherein the character recognition model comprises an encoder and a decoder.

3. The method according to claim 2, wherein inputting the character into the character recognition model comprises inputting data of an image including the character into the encoder of the character recognition model, and the encoder comprises a convolutional neural network.

4. The method according to claim 3, wherein
   the encoder comprises a full convolutional neural network, the full convolutional neural network comprises an input layer, a first predetermined quantity of convolutional layers, a second predetermined quantity of pooling layers, and an output layer,
   wherein the input layer comprises a plurality of input neurons for describing pixels of the image, the output layer comprises an output neuron for describing annotation vectors of the image, the convolutional layers each performs feature extraction on an output of a previous layer by using at least one predetermined convolution kernel to obtain an output of the convolutional layer itself, and the pooling layers each performs aggregation statistical processing on an output of a previous convolutional layer by using at least one predetermined pooling kernel to obtain an output of the pooling layer itself.

5. The method according to claim 2, wherein inputting the character into the character recognition model comprises obtaining data of the character with stroke information and inputting the data of the character with the stroke information into the encoder of the character recognition model, wherein the stroke information comprises pen-down or pen-up information of each point of the character, and wherein the encoder comprises a recurrent neural network (RNN).

6. The method according to claim 5, wherein the encoder comprises a predetermined number of stacked bidirectional Gated Recurrent Unit (GRU) layers,
   wherein the first bidirectional GRU layer generates a current GRU hidden state of the first bidirectional GRU layer based on the data of the character with the stroke information, a previous GRU hidden state of the first bidirectional GRU layer and a next GRU hidden state of the first bidirectional GRU layer, and
   each of other bidirectional GRU layers except for the first bidirectional GRU layer generates a current GRU hidden state of the bidirectional GRU layer itself based on a current GRU hidden state of a previous bidirectional GRU layer outputted from the previous bidirectional GRU layer, a previous GRU hidden state of the bidirectional GRU layer itself and a next GRU hidden state of the bidirectional GRU layer itself,
   wherein the current GRU hidden state of the last bidirectional GRU layer is used as annotation vectors of the character, to be inputted into the decoder.

7. The method according to claim 5, wherein the encoder comprises a predetermined number of stacked bidirectional GRU layers and a pooling layer,
   wherein the first bidirectional GRU layer generates a current GRU hidden state of the first bidirectional GRU layer based on the data of the character with the stroke information, a previous GRU hidden state of the first bidirectional GRU layer and a next GRU hidden state of the first bidirectional GRU layer,
   each of other bidirectional GRU layers except for the first bidirectional GRU layer generates a current GRU hidden state of the bidirectional GRU layer itself based on a current GRU hidden state of a previous bidirectional GRU layer outputted from the previous bidirectional GRU layer, a previous GRU hidden state of the bidirectional GRU layer itself and a next GRU hidden state of the bidirectional GRU layer itself, and
   the pooling layer generates annotation vectors of the character, to be inputted into the decoder, based on the current GRU hidden state of the last bidirectional GRU layer.

8. The method according to claim 2, wherein
the decoder comprises a first unidirectional GRU layer, an attention layer and a second unidirectional GRU layer,
wherein the first unidirectional GRU layer generates a prediction of a current GRU hidden state of the first unidirectional GRU layer based on a previous GRU hidden state of the second unidirectional GRU layer outputted from the second unidirectional GRU layer and a previous symbol,
wherein the attention layer generates a context vector based on the prediction of the current GRU hidden state of the first unidirectional GRU layer outputted from the first unidirectional GRU layer and annotation vectors outputted from the encoder,
wherein the second unidirectional GRU layer generates a current GRU hidden state of the second unidirectional GRU layer based on the context vector outputted from the attention layer and the prediction of the current GRU hidden state of the first unidirectional GRU layer outputted from the first unidirectional GRU layer,
wherein the decoder further generates a probability indicating whether an input is a target symbol based on the context vector, the current GRU hidden state of the second unidirectional GRU layer and the previous symbol.

9. The method according to claim 8, wherein the attention layer comprises a convolutional layer and a plurality of fully connected layers,
wherein the convolutional layer generates a coverage vector based on a previous attention coefficient matrix,
the plurality of fully connected layers generate a current attention coefficient matrix based on the coverage vector outputted from the convolutional layer, the annotation vectors outputted from the encoder and the prediction of the current GRU hidden state of the first unidirectional GRU layer outputted from the first unidirectional GRU layer,
the attention layer further generates the context vector based on the current attention coefficient matrix and the annotation vectors outputted from the encoder.

10. A non-transitory storage medium storing a computer program, wherein the computer program comprises a plurality of computer-readable instructions that, when executed by a computer, cause the computer to:
obtain a character;
convert the character into a radical based character recognition result, wherein the radical based character recognition result comprises symbols indicating radicals of the character and a structure of the radicals of the character; and
recognize the character based on the radical based character recognition result,
wherein the radical based character recognition result is in a form of a structure identity {radical . . . radical},
wherein the structure identity comprises a symbol indicating a left-right structure, a symbol indicating a top-bottom structure, a symbol indicating a top-left-surround structure, a symbol indicating a top-right-surround structure, a symbol indicating a bottom-left-surround structure, a symbol indicating a left-surround structure, a symbol indicating a bottom-surround structure, a symbol indicating a top-surround structure, a symbol indicating a surround structure, or a symbol indicating a within structure.

11. An apparatus for recognizing a character, comprising a processor and a non-transitory storage medium having a plurality of instructions stored thereon that, when executed by the processor, cause the processor to:
obtain a character;
convert the character into a radical based character recognition result, wherein the radical based character recognition result comprises symbols indicating radicals of the character and a structure of the radicals of the character; and
recognize the character based on the radical based character recognition result,
wherein the radical based character recognition result is in a form of a structure identity {radical . . . radical},
wherein the structure identity comprises a symbol indicating a left-right structure, a symbol indicating a top-bottom structure, a symbol indicating a top-left-surround structure, a symbol indicating a top-right-surround structure, a symbol indicating a bottom-left-surround structure, a symbol indicating a left-surround structure, a symbol indicating a bottom-surround structure, a symbol indicating a top-surround structure, a symbol indicating a surround structure, or a symbol indicating a within structure.

12. The apparatus according to claim 11, wherein converting the character into the radical based character recognition result comprises: inputting the character into a character recognition model to obtain the radical based character recognition result, wherein the character recognition model is obtained by training on a set of samples, and wherein the character recognition model comprises an encoder and a decoder.

13. The apparatus according to claim 12, wherein inputting the character into the character recognition model comprises inputting data of an image including the character into the encoder of the character recognition model, and the encoder comprises a convolutional neural network.

14. The apparatus according to claim 13, wherein
the encoder comprises a full convolutional neural network, the full convolutional neural network comprises an input layer, a first predetermined quantity of convolutional layers, a second predetermined quantity of pooling layers, and an output layer,
wherein the input layer comprises a plurality of input neurons for describing pixels of the image, the output layer comprises an output neuron for describing annotation vectors of the image, the convolutional layers each performs feature extraction on an output of a previous layer by using at least one predetermined convolution kernel to obtain an output of the convolutional layer itself, and the pooling layers each performs aggregation statistical processing on an output of a previous convolutional layer by using at least one predetermined pooling kernel to obtain an output of the pooling layer itself.

15. The apparatus according to claim 12, wherein inputting the character into the character recognition model comprises obtaining data of the character with stroke information and inputting the data of the character with the stroke information into the encoder of the character recognition model, wherein the stroke information comprises pen-down or pen-up information of each point of the character, and wherein the encoder comprises a recurrent neural network (RNN).

16. The apparatus according to claim 15, wherein the encoder comprises a predetermined number of stacked bidirectional GRU layers and a pooling layer,
wherein the first bidirectional GRU layer generates a current GRU hidden state of the first bidirectional GRU layer based on the data of the character with the stroke information, a previous GRU hidden state of the first bidirectional GRU layer and a next GRU hidden state of the first bidirectional GRU layer, each of other bidirectional GRU layers except for the first bidirectional GRU layer generates a current GRU hidden state of the bidirectional GRU layer itself based on a current GRU hidden state of a previous bidirectional GRU layer outputted from the previous bidirectional GRU layer, a previous GRU hidden state of the bidirectional GRU layer itself and a next GRU hidden state of the bidirectional GRU layer itself, and the pooling layer generates annotation vectors of the character, to be inputted into the decoder, based on the current GRU hidden state of the last bidirectional GRU layer.

17. The apparatus according to claim 12, wherein the decoder comprises a first unidirectional GRU layer, an attention layer and a second unidirectional GRU layer, wherein the first unidirectional GRU layer generates a prediction of a current GRU hidden state of the first unidirectional GRU layer based on a previous GRU hidden state of the second unidirectional GRU layer outputted from the second unidirectional GRU layer and a previous symbol, wherein the attention layer generates a context vector based on the prediction of the current GRU hidden state of the first unidirectional GRU layer outputted from the first unidirectional GRU layer and annotation vectors outputted from the encoder, wherein the second unidirectional GRU layer generates a current GRU hidden state of the second unidirectional GRU layer based on the context vector outputted from the attention layer and the prediction of the current GRU hidden state of the first unidirectional GRU layer outputted from the first unidirectional GRU layer, wherein the decoder further generates a probability indicating whether an input is a target symbol based on the context vector, the current GRU hidden state of the second unidirectional GRU layer and the previous symbol.

18. The apparatus according to claim 17, wherein the attention layer comprises a convolutional layer and a plurality of fully connected layers, wherein the convolutional layer generates a coverage vector based on a previous attention coefficient matrix, the plurality of fully connected layers generate a current attention coefficient matrix based on the coverage vector outputted from the convolutional layer, the annotation vectors outputted from the encoder and the prediction of the current GRU hidden state of the first unidirectional GRU layer outputted from the first unidirectional GRU layer, the attention layer further generates the context vector based on the current attention coefficient matrix and the annotation vectors outputted from the encoder.

* * * * *